United States Patent
Watson et al.

(10) Patent No.: US 9,692,773 B1
(45) Date of Patent: Jun. 27, 2017

(54) SYSTEMS AND METHODS FOR IDENTIFYING DETECTION-EVASION BEHAVIORS OF FILES UNDERGOING MALWARE ANALYSES

(71) Applicant: Symantec Corporation, Mountain View, CA (US)

(72) Inventors: Andrew Watson, Gloucestershire (GB); Abubakar Wawda, Cupertino, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 14/567,440

(22) Filed: Dec. 11, 2014

(51) Int. Cl.
G06F 21/00 (2013.01)
H04L 29/06 (2006.01)
G06F 21/56 (2013.01)
G06F 21/53 (2013.01)

(52) U.S. Cl.
CPC .......... H04L 63/1416 (2013.01); G06F 21/53 (2013.01); G06F 21/56 (2013.01); G06F 21/566 (2013.01)

(58) Field of Classification Search
CPC ......... G06F 21/566; G06F 21/56; G06F 21/53
See application file for complete search history.

(56) References Cited

U.S. PATENT DOCUMENTS

| | | | | |
|---|---|---|---|---|
| 8,555,385 B1* | 10/2013 | Bhatkar | ................ | G06F 21/556 726/22 |
| 8,813,222 B1* | 8/2014 | Codreanu | ............... | G06F 21/56 726/22 |
| 8,893,278 B1* | 11/2014 | Chechik | ................ | H04L 63/145 713/188 |
| 9,178,900 B1* | 11/2015 | Li | ........................ | H04L 63/1416 |
| 9,223,972 B1* | 12/2015 | Vincent | .................... | G06F 21/56 |

(Continued)

OTHER PUBLICATIONS

Balzarotti et al, Efficient Detection of Split Personalities in Malware, Feb. 2010, 17 pages.*

(Continued)

*Primary Examiner* — Farid Homayounmehr
*Assistant Examiner* — Christopher C Harris
(74) *Attorney, Agent, or Firm* — FisherBroyles LLP (57) ABSTRACT

The disclosed computer-implemented method for identifying detection-evasion behaviors of files undergoing malware analyzes may include (1) monitoring, by a plurality of monitor components related to an automated execution environment, a file that is undergoing a malware analysis in the automated execution environment, (2) detecting a suspicious discrepancy among the monitor components with respect to computing activity observed in connection with the malware analysis by (A) identifying a monitor component that has observed the computing activity in connection with the malware analysis and (B) identifying another monitor component that has not observed the computing activity in connection with the malware analysis, and then (3) determining, based at least in part on the suspicious discrepancy, that the file demonstrates a detection-evasion behavior that led to the other monitor component not observing the computing activity in connection with the malware analysis. Various other methods, systems, and computer-readable media are also disclosed.

16 Claims, 6 Drawing Sheets

(56) References Cited

U.S. PATENT DOCUMENTS

| | | | |
|---|---|---|---|
| 2004/0205419 A1 | 10/2004 | Liang et al. | |
| 2008/0016339 A1* | 1/2008 | Shukla | G06F 21/53 713/164 |
| 2009/0094175 A1 | 4/2009 | Provos et al. | |
| 2011/0167494 A1* | 7/2011 | Bowen | G06F 21/566 726/24 |
| 2011/0219450 A1* | 9/2011 | McDougal | G06F 21/56 726/23 |
| 2012/0079596 A1* | 3/2012 | Thomas | G06F 21/55 726/24 |
| 2013/0145463 A1* | 6/2013 | Ghosh | G06F 21/56 726/22 |
| 2013/0179971 A1* | 7/2013 | Harrison | G06F 21/55 726/23 |
| 2013/0312099 A1* | 11/2013 | Edwards | G06F 21/554 726/24 |
| 2014/0223560 A1* | 8/2014 | Christodorescu | G06F 21/56 726/23 |
| 2014/0317745 A1* | 10/2014 | Kolbitsch | G06F 21/566 726/24 |
| 2014/0380474 A1* | 12/2014 | Paithane | G06F 21/566 726/23 |
| 2015/0074810 A1 | 3/2015 | Saher et al. | |
| 2015/0096022 A1* | 4/2015 | Vincent | G06F 21/566 726/23 |
| 2015/0150131 A1* | 5/2015 | Boutnaru | G06F 21/567 726/23 |
| 2015/0163242 A1 | 6/2015 | Laidlaw et al. | |
| 2015/0220735 A1* | 8/2015 | Paithane | G06F 21/566 726/23 |
| 2015/0242626 A1* | 8/2015 | Wang | G06F 21/56 726/23 |

OTHER PUBLICATIONS

Andrew Watson; Systems and Methods for Accelerating Malware Analyses in Automated Execution Environments; U.S. Appl. No. 14/569,163, filed Dec. 12, 2014.
Andrew Watson; Systems and Methods for Protecting Automated Execution Environments Against Enumeration Attacks; U.S. Appl. No. 14/569,101, filed Dec. 12, 2014.
Bianchi, Antonio "Blacksheep: Detecting Compromised Hosts in Homogeneous Crowds", https://seclab.cs.ucsb.edu/media/uploads/papers/blacksheep.pdf, as accessed Oct. 15, 2014, CCS'12, Raleigh, North Carolina, (Oct. 16-18, 2012).
Hyde, Doug "A Survey on the Security of Virtual Machines", http://www.cse.wustl.edu/~jain/cse571-09/ftp/vmsec/index.html, as accessed Oct. 15, 2014, (2009).
Baliga, Arati et al., "Automated Defense from Rootkit Attacks", http://www.vmware.com/pdf/cambridge_rootkit.pdf, as accessed Oct. 15, 2014, (May 16, 2006).
"Securonix", http://www.securonix.com/2014/03/securonix-announces-the-release-of-data-exfiltration-intelligence-application-delivers-the-industrysfirst-proactive-detection-and-prevention-against-insider-and-external-data-exfiltration-attacks/, as accessed Oct. 15, 2014, (2013).
"Data Exfiltration Intelligence Product Tour", http://www.securonix.com/secureproduct/dataexfiltration/, as accessed Oct. 15, 2014, Securonix, Inc, (2013).
"Detect Data Exfiltration with Flow Collection and Analysis", http://www.lancope.com/solutions/security-operations/data-loss/, as accessed Oct. 15, 2014, Lancope, Inc., (Mar. 3, 2011).
Zeltser, Lenny "Speeding up the Clock for Malware Analysis With Accelerify", http://blog.zeltser.com/post/49399925347/accelerify-speeds-up-clock-for-malware, as accessed Oct. 15, 2014, (May 1, 2013).
"FireEye, Inc.", https://www.fireeye.com/, as accessed Oct. 15, 2014, (Oct. 12, 1999).
"Palo Alto Networks", https://www.paloaltonetworks.com/, as accessed Oct. 15, 2014, (Oct. 18, 2000).
"Blue Coat", https://www.bluecoat.com/, as accessed Oct. 15, 2014, (Mar. 24, 2002).
Clausing, Jim "Building an Automated Behavioral Malware Analysis Environment using Open Source Software", http://www.sans.org/reading-room/whitepapers/tools/building-automated-behavioral-malware-analysis-environment-open-sourcesoftware-33129, as accessed Oct. 15, 2014, SANS Institute InfoSec Reading Room, (2009).
Song, Chengyu et al., "Impeding Automated Malware Analysis with Environment-sensitive Malware", https://www.usenix.org/system/files/conference/hotsec12/hotsec12-final24.pdf, as accessed Oct. 15, 2012, HotSec '12, 7th USENIX Workshop on Hot Topics in Security, Bellevue, WA, (Aug. 7, 2012).
"Chapter 6: Malware Analysis Basics", http://www.porcupine.org/forensics/forensic-discovery/chapter6.html, as accessed Oct. 15, 2014, (Jan. 16, 2006).
"BruCON", http://2014.brucon.org/index.php/, as accessed Oct. 15, 2014, (On or before Oct. 15, 2014).
"Mandiant, A FireEye Company", https://www.mandiant.com/training/course/malware-analysis-crash-course-at-mircon, as accessed Oct. 15, 2014, (Aug. 14, 2014).
"Training Courses—Malware Analysis", https://www.mandiant.com/training/courses/black-hat-trainings-malware-analysis-crash-course, as accessed Oct. 15, 2014, Mandiant, A FireEye Company, (On or before Oct. 15, 2014).
"Cuckoo Sandbox", http://www.cuckoosandbox.org/about.html, as accessed Oct. 15, 2014, (Nov. 13, 2012).
Vashisht, Sai Omkar et al., "Turing Test in Reverse: New Sandbox-Evasion Techniques Seek Human Interaction", https://www.fireeye.com/blog/threat-research/2014/06/turing-test-in-reverse-new-sandbox-evasion-techniques-seek-human-interaction.html, as accessed Nov. 12, 2014, FireEye, Inc.,(Jun. 24, 2014).
Lewis, Nick "Sandbox evasion: How to detect cloaked malware", http://searchsecurity.techtarget.com/answer/Sandbox-evasion-How-to-detect-cloaked-malware, as accessed Nov. 12, 2014, (Jul. 2014).
Mimoso, Michael "Shylock Malware Evasion Techniques Now Detect RDP Connections", http://threatpost.com/shylock-malware-evasion-techniques-now-detect-rdp-connections-112912/77260, as accessed Nov. 12, 2014, (Nov. 29, 2012).
Cannell, Joshua "A Look at Malware with Virtual Machine Detection", https://blog.malwarebytes.org/intelligence/2014/02/a-look-at-malware-with-virtual-machine-detection/, as accessed Nov. 12, 2014, (Feb. 6, 2014).
"How does malware know the difference between the virtual world and the real world?", http://vrt-blog.snort.org/2009/10/how-does-malware-know-difference.html, as accessed Nov. 12, 2014, (Oct. 14, 2009).
Mushtaq, Atif "The Dead Giveaways of VM-Aware Malware", https://www.fireeye.com/blog/threat-research/2011/01/the-dead-giveaways-of-vm-aware-malware.html, as accessed Nov. 12, 2014, FireEye, Inc., (Jan. 27, 2011).
"Windows Programming/User Mode vs Kernel Mode", http://en.wikibooks.org/wiki/Windows_Programming/User_Mode_vs_Kernel_Mode, as accessed Nov. 12, 2014, Wikibooks, (Feb. 19, 2006).
Sikorski, Michael, "Training Practical Malware Analysis: Rapid Introduction", http://2014.brucon.org/index.php/Training_Practical_Malware_Analysis:_Rapid_Introduction.html, as accessed Oct. 15, 2014, BruCON 2014, (Sep. 2014).

\* cited by examiner

Monitoring Information
400(1)

| MONITOR COMPONENTS: | User Mode Hooks |
|---|---|
| OBSERVED COMPUTING ACTIVITIES | TIMESTAMPS |
| Changing Registry Keys | 2014-10-28 T 10:45:30 UTC |

⋮

Monitoring Information
400(N)

| MONITOR COMPONENTS: | Kernel Mode Hooks |
|---|---|
| OBSERVED COMPUTING ACTIVITIES | TIMESTAMPS |
| Writing Data to Disk | 2014-10-28 T 10:45:09 UTC |
| Connecting to Remote Device | 2014-10-28 T 10:45:16 UTC |
| Transmitting Data Across Network | 2014-10-28 T 10:45:21 UTC |
| Changing Registry Keys | 2014-10-28 T 10:45:30 UTC |
| Altering Configuration of Disk | 2014-10-28 T 10:45:41 UTC |

SYSTEMS AND METHODS FOR IDENTIFYING DETECTION-EVASION BEHAVIORS OF FILES UNDERGOING MALWARE ANALYSES

BACKGROUND

Automated execution environments (sometimes referred to as "sandboxes") are often used to facilitate controlled execution and/or observation of suspicious and/or unknown files. For example, an automated execution environment may execute a file sample to observe whether the file sample exhibits any potentially malicious behaviors. By executing and observing the file sample in this way, the automated execution environment may be able to determine that a file is malicious without exposing the underlying computing platform to certain risks associated with the malicious file.

Unfortunately, conventional automated execution environments may have deficiencies and/or vulnerabilities that allow certain malicious files to evade detection during malware analyses. For example, a conventional automated execution environment may include certain hooks (such as user mode hooks and/or kernel mode hooks) inserted in various Application Programming Interface (API) functions. In this example, the hooks may be configured to record and/or log when a file sample initiates certain API calls during a malware analysis. In the event that the hooks' locations are fairly well known and/or the file sample is configured to search for such hooks, the file sample may be able to bypass the hooks without detection by the conventional automated execution environment. As a result, the conventional automated execution environment may be unable to accurately track the file sample's behaviors such that the file sample appears clean even in the event that the file sample contains malware.

The instant disclosure, therefore, identifies and addresses a need for additional and improved systems and methods for identifying detection-evasion behaviors of files undergoing malware analyses.

SUMMARY

As will be described in greater detail below, the instant disclosure describes various systems and methods for identifying detection-evasion behaviors of files undergoing malware analyses by detecting suspicious discrepancies among monitor components related to automated execution environments.

In one example, a computer-implemented method for identifying detection-evasion behaviors of files undergoing malware analyses may include (1) monitoring, by a plurality of monitor components related to an automated execution environment, a file that is undergoing a malware analysis in the automated execution environment, (2) detecting at least one suspicious discrepancy among the plurality of monitor components with respect to computing activity observed in connection with the malware analysis by (A) identifying at least one monitor component that has observed the computing activity in connection with the malware analysis and (B) identifying at least one other monitor component that has not observed the computing activity in connection with the malware analysis, and then (3) determining, based at least in part on the suspicious discrepancy, that the file demonstrates a detection-evasion behavior that led to the other monitor component not observing the computing activity in connection with the malware analysis.

Examples of monitor components related to an automated execution environment include, without limitation, user mode hooks, kernel mode hooks, Packet CAPture (PCAP) components, file system monitors, network switches, variations of one or more of the same, combinations of one or more of the same, or any other suitable monitor components. Examples of computing activity monitored in connection with a malware analysis include, without limitation, performing an Input/Output (I/O) operation, writing data to a storage device, reading data from a storage device, transmitting data across a network, changing one or more registry keys, altering a configuration of a storage device, variations of one or more of the same, combinations of one or more of the same, or any other computing activity observed in connection with a malware analysis.

In one example, the method may also include classifying the file as potentially malicious due at least in part to the detection-evasion behavior demonstrated by the file. In another example, the method may further include monitoring computing activity in connection with the malware analysis from inside of the automated execution environment. Additionally or alternatively, the method may include monitoring computing activity in connection with the malware analysis from outside of the automated execution environment.

In one example, the method may also include determining that the file is attempting to evade detection by obfuscating the computing activity from the other monitor component. In another example, the method may further include modifying at least one aspect of the automated execution environment to account for the detection-evasion behavior during a subsequent malware analysis in the automated execution environment.

In one example, the method may also include directing the automated execution environment to execute the file in connection with the malware analysis. In another example, the method may further include detecting the suspicious discrepancy among the plurality of monitor components with respect to computing activity observed during the malware analysis. Additionally or alternatively, the method may include detecting the suspicious discrepancy among the plurality of monitor components with respect to computing activity observed after the malware analysis.

As another example, a system for implementing the above-described method may include (1) a monitoring module that monitors, via a plurality of monitor components related to an automated execution environment, a file that is undergoing a malware analysis in the automated execution environment, (2) a detection module that detects at least one suspicious discrepancy among the plurality of monitor components with respect to computing activity observed in connection with the malware analysis by (A) identifying at least one monitor component that has observed the computing activity in connection with the malware analysis and (B) identifying at least one other monitor component that has not observed the computing activity in connection with the malware analysis, (3) a determination module that determines, based at least in part on the suspicious discrepancy, that the file demonstrates a detection-evasion behavior that led to the other monitor component not observing the computing activity in connection with the malware analysis, and (4) at least one physical processor that executes the monitoring module, the detection module, and the determination module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, by a plurality of monitor components related to an automated execution environment, a file that is undergoing a malware analysis in the automated execution environment, (2) detect at least one suspicious discrepancy among the plurality of monitor components with respect to computing activity observed in connection with the malware analysis by (A) identifying at least one monitor component that has observed the computing activity in connection with the malware analysis and (B) identifying at least one other monitor component that has not observed the computing activity in connection with the malware analysis, and then (3) determine, based at least in part on the suspicious discrepancy, that the file demonstrates a detection-evasion behavior that led to the other monitor component not observing the computing activity in connection with the malware analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying detection-evasion behaviors of files undergoing malware analyses. As will be explained in greater detail below, by monitoring a file undergoing a malware analysis via a plurality of monitor components related to an automated execution environment, the systems and methods described herein may detect a suspicious discrepancy among the monitor components related to the automated execution environment. Moreover, by detecting the suspicious discrepancy among the monitor components, the systems and methods described herein may determine that the file undergoing the malware analysis demonstrates a detection-evasion behavior that led to the suspicious discrepancy. In response to this determination, the systems and methods described herein may classify the file as potentially malicious due at least in part to the suspicious discrepancy.

Figure 1:
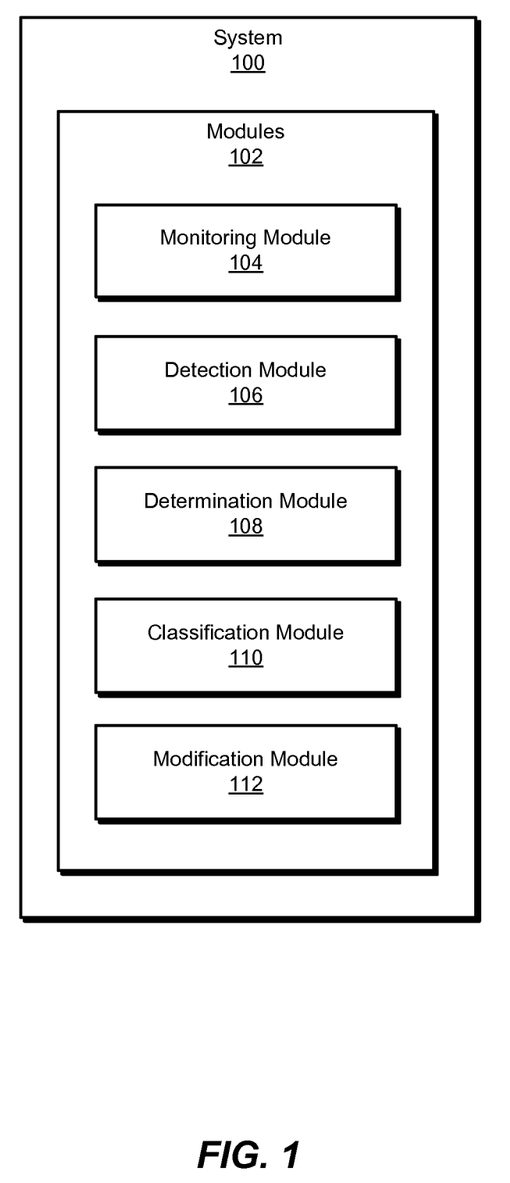
FIG. 1 is a block diagram of an exemplary system for identifying detection-evasion behaviors of files undergoing malware analyses.
Figure 2:
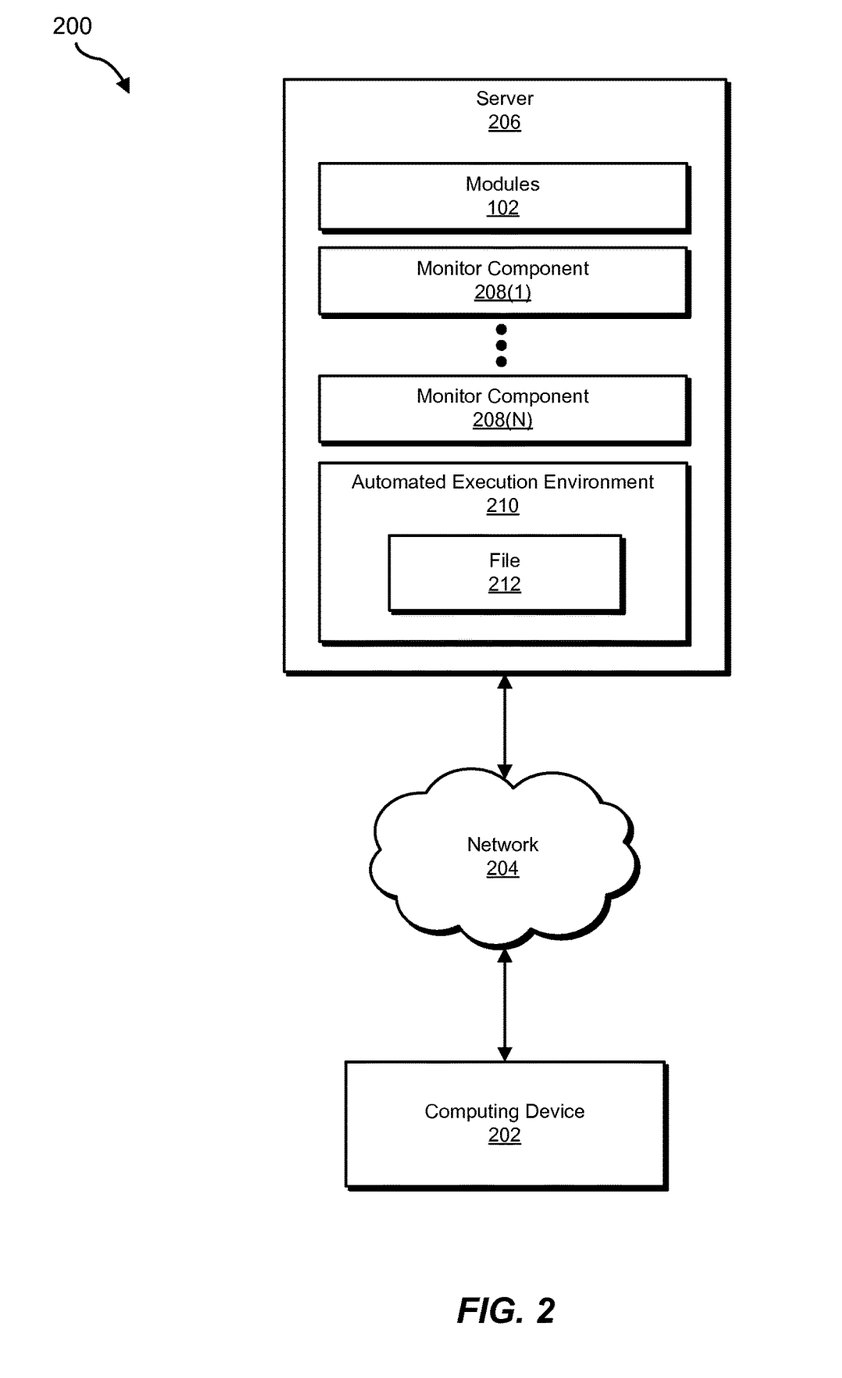
FIG. 2 is a block diagram of an additional exemplary system for identifying detection-evasion behaviors of files undergoing malware analyses.

The following will provide, with reference to FIGS. 1-2, detailed descriptions of exemplary systems for identifying detection-evasion behaviors of files undergoing malware analyses. Detailed descriptions of corresponding computer-implemented methods will be provided in connection with FIG. 3. Detailed descriptions of exemplary monitoring information generated by monitor components will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying detection-evasion behaviors of files undergoing malware analyses. As illustrated in this figure, exemplary system 100 may include one or more modules 102 for performing one or more tasks. For example, and as will be explained in greater detail below, exemplary system 100 may include a monitoring module 104 that monitors a file that is undergoing a malware analysis in an automated execution environment. Monitoring module 104 may include a plurality of monitor components related to the automated execution environment. Additionally or alternatively, monitoring module 104 may collect monitoring information and/or observations from the monitor components in connection with the malware analysis.

Exemplary system 100 may also include a detection module 106 that detects at least one suspicious discrepancy among the plurality of monitor components with respect to computing activity observed in connection with the malware analysis. For example, detection module 106 may detect the suspicious discrepancy by identifying at least one monitor component that has observed the computing activity in connection with the malware analysis and identifying at least one other monitor component that has not observed the computing activity in connection with the malware analysis.

In addition, and as will be described in greater detail below, exemplary system 100 may include a determination module 108 that determines, based at least in part on the suspicious discrepancy, that the file demonstrates a detection-evasion behavior that led to the other monitor component not observing the computing activity in connection with the malware analysis. Moreover, exemplary system 100 may include a classification module 110 that classifies the file as potentially malicious due at least in part to the detection-evasion behavior demonstrated by the file.

Additionally or alternatively, exemplary system 100 may include a modification module 112 that modifies at least one aspect of the automated execution environment to account for the detection-evasion behavior during a subsequent malware analysis in the automated execution environment.

Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, server 206 may be programmed with one or more of modules 102 and/or one or more monitor components 208(1)-(N) that observe computing activity in connection with a malware analysis performed on a file 212. In this example, server 206 may include an automated execution environment 210 that performs the malware analysis on file 212.

In one example, computing device 202 may be programmed with one or more of modules 102 and/or one or more of monitor components 208(1)-(N) that observe computing activity in connection with the malware analysis performed on file 212. Additionally or alternatively, computing device 202 may include automated execution environment 210 that performs the malware analysis on file 212.

In one embodiment, one or more of modules 102 from FIG. 1 may, when executed by at least one processor of computing device 202 and/or server 206, enable computing device 202 and/or server 206 to identify detection-evasion behaviors of files undergoing malware analyses. For example, and as will be described in greater detail below, one or more of modules 102 may cause computing device 202 and/or server 206 to (1) monitor, by one or more of monitor components 208(1)-(N) related to automated execution environment 210, file 212 that is undergoing a malware analysis in automated execution environment 210, (2) detecting at least one suspicious discrepancy among monitor components 208(1)-(N) with respect to computing activity observed in connection with the malware analysis by (A) identifying monitor component 208(1) as having observed the computing activity in connection with the malware analysis and (B) identifying monitor component 208(N) as not having observed the computing activity in connection with the malware analysis, and then (3) determining, based at least in part on the suspicious discrepancy, that file 212 demonstrates a detection-evasion behavior that led to monitor component 208(N) not observing the computing activity in connection with the malware analysis.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device capable of performing malware analyses on files and/or observing computing activity in connection with malware analyses. Examples of server 206 include, without limitation, application servers, security servers, web servers, storage servers, deduplication servers, and/or database servers configured to run certain software applications and/or provide various security, web, storage, deduplication, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Monitor components 208(1)-(N) generally represent any type or form of device, program, and/or mechanism that monitors, observes, and/or logs computing activity occurring in connection with malware analyses. In one example, monitor components 208(1)-(N) may represent portions of monitoring module 104. In another example, monitor components 208(1)-(N) may be separate and distinct from monitoring module 104. Examples of monitor components 208(1)-(N) include, without limitation, user mode hooks, kernel mode hooks, PCAP components, file system monitors, network switches, variations of one or more of the same, combinations of one or more of the same, or any other suitable monitor components.

Although illustrated as portions of server 206 in FIG. 2, monitor components 208(1)-(N) may also include and/or represent portions of network 204 and/or computing device 202. For example, monitor component 208(1) may represent a PCAP component included in network 204 and/or computing device 202. Additionally or alternatively, monitor component 208(N) may represent a network switch included in network 204.

Similarly, although illustrated external to automated execution environment 210 in FIG. 2, monitor components 208(1)-(N) may also include and/or represent portions of automated execution environment 210. For example, monitor component 208(1) may represent a user mode hook that is internal to automated execution environment 210. Additionally or alternatively, monitor component 208(N) may represent a kernel mode hook that is internal to automated execution environment 210.

Automated execution environment 210 generally represents any type or form of computing environment and/or mechanism that facilitates controlled execution, monitoring, and/or observation of file samples to determine whether such file samples contain malware. In one example, automated execution environment 210 may execute file 212 to facilitate a malware analysis that involves monitoring and/or observing the run-time characteristics, attributes, and/or behaviors of file 212. In this example, automated execution environment 210 may limit and/or restrict certain resources (such as files, file systems, memory locations, and/or network functionalities) from being accessed and/or used by file 212 during the malware analysis. By limiting and/or restricting such resources in this way, automated execution environment 210 may be able to facilitate the malware analysis without exposing the underlying computing platform to certain risks potentially associated file 212.

File 212 generally represents any type or form of file, portion of a file, and/or file sample that includes data, metadata, and/or information. In one example, file 212 may include one or more data segments that represent a complete file. In another example, file 212 may include one or more data segments that represent a file sample or portion selected from a complete file. Examples of file 212 include, without limitation, executable files, document files, data files, batch files, archive files, media files, backup files, library files, compressed files, scripts, binary code, machine code, samples or portions of one or more of the same, variations of one or more of the same, combinations of one or more of the same, or any other suitable file.

Figure 3:
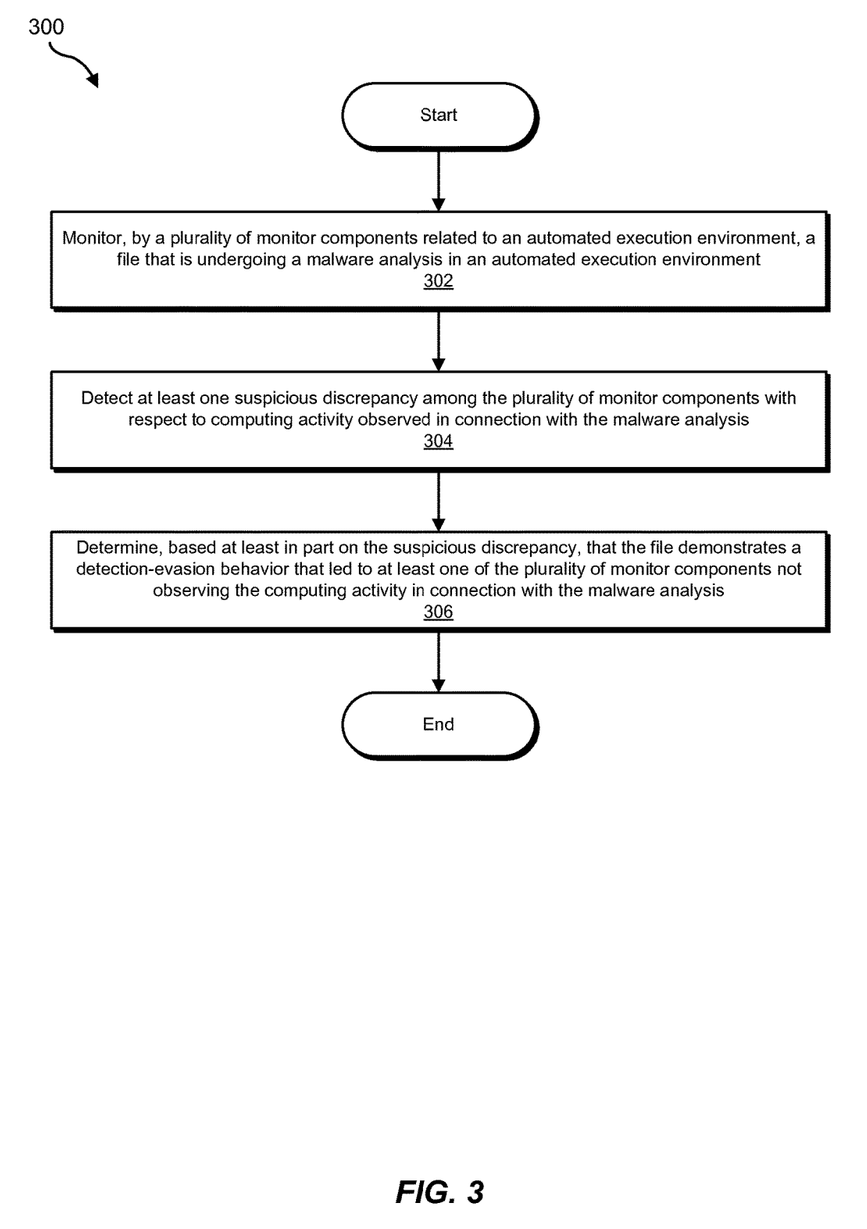
FIG. 3 is a flow diagram of an exemplary method for identifying detection-evasion behaviors of files undergoing malware analyses.

FIG. 3 is a flow diagram of an exemplary computer-implemented method 300 for identifying detection-evasion behaviors of files undergoing malware analyses. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may monitor, by a plurality of monitor components related to an automated execution environment, a file that is undergoing a malware analysis in the automated execution environment. For example, monitoring module 104 may, as part of server 206 and/or computing device 202 in FIG. 2, monitor file 212 undergoing a malware analysis in automated execution environment 210. In this example, monitoring module 104 may include and/or deploy one or more of monitor components 208(1)-(N) to facilitate monitoring file 212 from different perspectives during the malware analysis.

The systems described herein may perform step 302 in a variety of ways and/or contexts. In one example, monitoring module 104 may direct automated execution environment 210 to execute file 212 in connection with the malware analysis. For example, monitoring module 104 may identify file 212 as being new, unknown, and/or suspicious relative to a computing community (such as a security vendor's customer base). In this example, monitoring module 104 may direct automated execution environment 210 to execute file 212 to facilitate a malware analysis that involves monitoring and/or observing the run-time characteristics, attributes, and/or behaviors of file 212.

In one example, monitoring module 104 may monitor computing activity in connection with the malware analysis from inside of automated execution environment 210. For example, monitoring module 104 may include and/or deploy monitor component 208(1) within automated execution environment 210. In this example, monitor component 208(1) may include and/or represent a user mode hook, a kernel mode hook, a PCAP component, and/or a file system monitor. By monitoring the computing activity in connection with the malware analysis from inside of automated execution environment 210, monitoring module 104 may be able facilitate a comparison of observations made inside of automated execution environment 210 with observations made outside of automated execution environment 210.

Additionally or alternatively, monitoring module 104 may monitor computing activity in connection with the malware analysis from outside of automated execution environment 210. For example, monitoring module 104 may include and/or deploy monitor component 208(N) external to automated execution environment 210. In this example, monitor component 208(N) may include and/or represent a PCAP component, a file system monitor, and/or a network switch. By monitoring the computing activity in connection with the malware analysis from outside of automated execution environment 210, monitoring module 104 may be able facilitate a comparison of observations made inside of automated execution environment 210 with observations made outside of automated execution environment 210.

Examples of computing activity monitored in connection with the malware analysis include, without limitation, performing an I/O operation, writing data to a storage device, reading data from a storage device, transmitting data across a network, changing one or more registry keys, altering a configuration of a storage device, variations of one or more of the same, combinations of one or more of the same, or any other suitable computing activity.

As a specific example, monitor components 208(1)-(N) may include and/or represent user mode hooks that record and/or log API calls within automated execution environment 210. In this example, the user mode hooks may include and/or represent code (e.g., a jump instruction) inserted at the beginning of certain API functions (e.g., a connect function and/or a listen function) that are operable in user mode. This code (sometimes referred to as a "trampoline") may temporarily transfer the flow of execution from those API functions to another memory location where additional code records and/or logs any calls to those API functions. Upon recording and/or logging API calls in this way, the additional code may transfer the flow of execution back to the called API functions.

Additionally or alternatively, monitor components 208(1)-(N) may include and/or represent kernel mode hooks that record and/or log API calls within automated execution environment 210. In this example, the kernel mode hooks may include and/or represent code (e.g., a jump instruction) inserted at the beginning of certain Native API functions (e.g., a WriteFile function and/or a ReadFile function) that are operable in kernel mode. This code may temporarily transfer the flow of execution from those Native API functions to another memory location where additional code records and/or logs any calls to those Native API functions. Upon recording and/or logging API calls in this way, the additional code may transfer the flow of execution back to the called Native API functions.

As another example, a monitor component within monitor components 208(1)-(N) may include and/or represent a PCAP component and/or a network switch. In this example, the PCAP component and/or network switch may record and/or log network traffic originating from server 206 as a result of the execution of file 212 by automated execution environment 210.

In one example, monitoring module 104 may collect monitoring information from one or more of monitor components 208(1)-(N) in connection with the malware analysis. For example, monitoring module 104 may request any monitoring information from monitor components 208(1)-(N) in connection with the malware analysis. Such monitoring information may identify the computing activity observed by monitor components 208(1)-(N) in connection with the malware analysis. In response to the request, monitoring components 208(1)-(N) may each send their respective monitoring information to monitoring module 104. By collecting the monitoring information in this way, monitoring module 104 may be able to facilitate detection of any suspicious discrepancies among monitor components 208(1)-(N) with respect to the computing activity observed in connection with the malware analysis.

Figure 4:
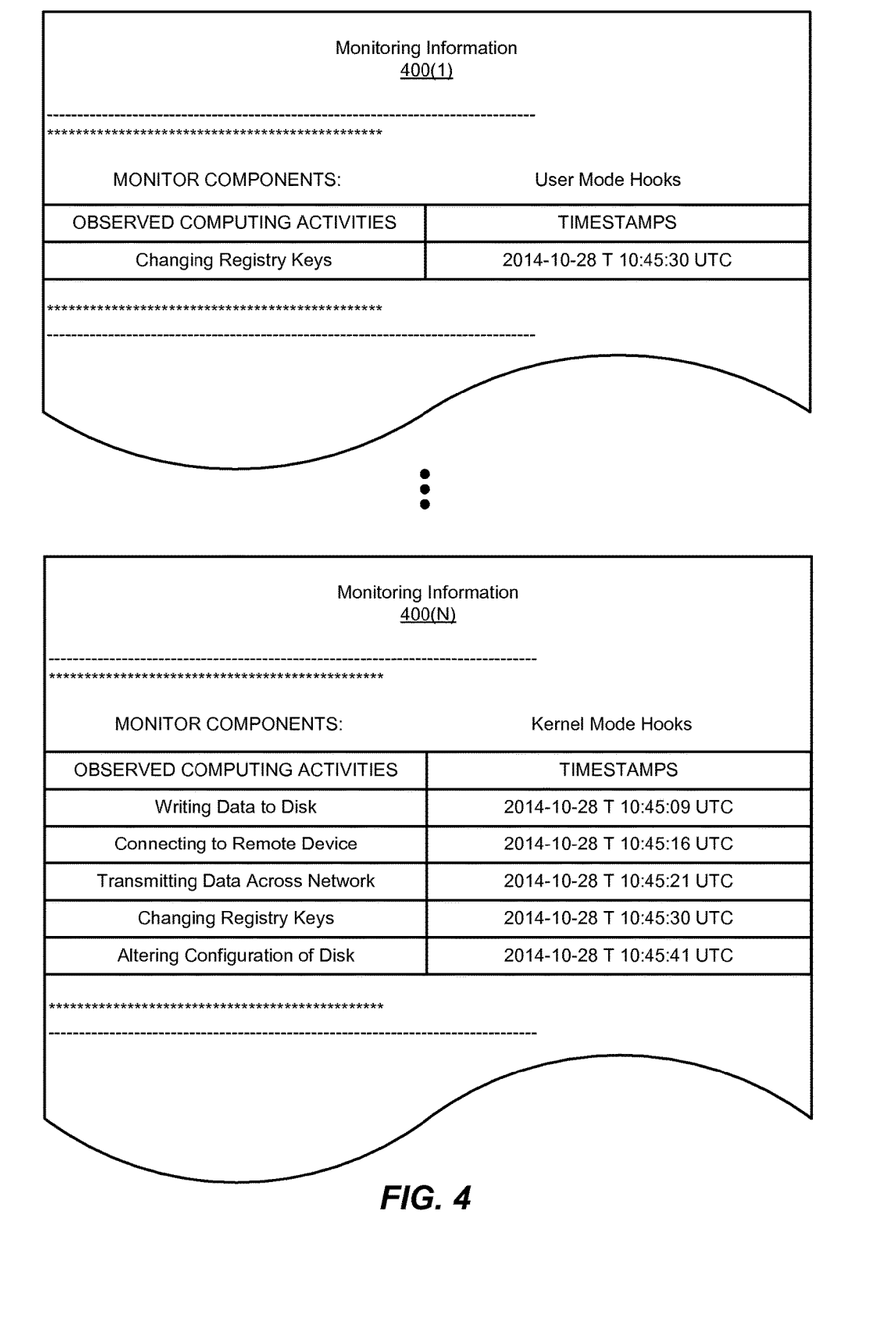
FIG. 4 is an illustration of exemplary monitoring information generated by monitor components in connection with a malware analysis.

As a specific example, monitor components 208(1)-(N) may include and/or represent user mode hooks that record and/or log any calls to certain API functions. In this example, monitor components 208(1)-(N) may generate monitoring information 400(1) in FIG. 4. As illustrated in FIG. 4, monitoring information 400(1) may identify the monitor components (in this example, "User Mode Hooks"), the computing activities observed by the monitor components (in this example, "Changing Registry Keys"), and/or timestamps corresponding to the observed computing activities (in this example, "2014-10-28 T 10:45:30 UTC").

Additionally or alternatively, monitor components 208(1)-(N) may include and/or represent kernel mode hooks that record and/or log any calls to certain Native API functions. In this example, monitor components 208(1)-(N) may generate monitoring information 400(N) in FIG. 4. As illustrated in FIG. 4, monitoring information 400(N) may identify the monitor components (in this example, "Kernel Mode Hooks"), the computing activities observed by the monitor components (in this example, "Writing Data to Disk," "Connecting to Remote Device," "Transmitting Data Across Network," "Changing Registry Keys," and "Altering Configuration of Disk"), and/or timestamps corresponding to the observed computing activities (in this example, "2014-10-28 T 10:45:09 UTC," "2014-10-28 T 10:45:16 UTC," "2014-10-28 T 10:45:21 UTC," "2014-10-28 T 10:45:30 UTC," and "2014-10-28 T 10:45:41 UTC").

In one example, determination module 108 may determine that the computing activities logged in monitoring information 400(1)-(N) resulted from the execution of file 212 based at least in part on the timestamps. For example, determination module 108 may identify the timestamps corresponding to the computing activities logged in monitoring information 400(1)-(N). In this example, determination module 108 may determine that these computing activities were all observed during the malware analysis performed on file 212 and/or within a certain amount of time of one another. As a result, determination module 108 may determine that these computing activities resulted from the execution of file 212 during the malware analysis.

As illustrated in FIG. 3, at step 304 one or more of the systems described herein may detect at least one suspicious discrepancy among the plurality of monitor components with respect to the computing activity observed in connection with the malware analysis. For example, detection module 106 may, as part of server 206 and/or computing device 202 in FIG. 2, detect at least one suspicious discrepancy among monitor components 208(1)-(N) with respect to the computing activity observed in connection with the malware analysis. In this example, the suspicious discrepancy may result from monitor component 208(1) observing the computing activity and monitor component 208(N) not observing the computing activity. The term "suspicious discrepancy," as used herein, generally refers to any type or form of discrepancy, difference, and/or inconsistency that is unexpected among monitor components.

The systems described herein may perform step 304 in a variety of ways and/or contexts. In some examples, detection module 106 may detect the suspicious discrepancy by identifying monitor component 208(1) as having observed the computing activity and monitor component 208(N) as not having observed the computing activity. For example, detection module 106 may detect that monitor component 208(1) observed a specific I/O operation resulting from the execution of file 212 by automated execution environment 210. In this example, detection module 106 may also detect that monitor component 208(N) did not observe the specific I/O operation even though monitor component 208(N) is expected to observe that type of I/O operation.

As another example, detection module 106 may detect that monitor component 208(1) observed a specific read or write operation. In this example, detection module 106 may also detect that monitor component 208(N) did not observe the specific read or write operation even though monitor component 208(N) is expected to observe that type of read or write operation.

As a further example, detection module 106 may detect that monitor component 208(1) observed some specific network traffic originating from server 206 as a result of the execution of file 212 by automated execution environment 210. For example, detection module 106 may detect that monitor component 208(1) observed certain data packets sent from server 206 to computing device 202 via network 204 during the malware analysis. In this example, detection module 106 may also detect that monitor component 208(N) did not observe those data packets even though monitor component 208(N) is expected to observe that type of network traffic.

As an additional example, detection module 106 may detect that monitor component 208(1) observed certain changes to registry keys on server 206 as a result of the execution of file 212 by automated execution environment 210. In this example, detection module 106 may also detect that monitor component 208(N) did not observe those changes to the registry keys on server 206 even though monitor component 208(N) is expected to observe that type of change.

Additionally or alternatively, detection module 106 may detect that monitor component 208(1) observed certain alterations to the configuration of a storage device. In one example, detection module 106 may detect that monitor component 208(1) observed an alteration to the geometry of a disk. For example, file 212 may include and/or represent a rootkit (such as Mebroot) that covertly adds a hidden partition to the back of the disk. In this example, detection module 106 may also detect that monitor component 208(N) did not observe that alteration to the disk geometry even though monitor component 208(N) is expected to observe that type of alteration.

In some examples, detection module 106 may detect the suspicious discrepancy among monitor components 208(1)-(N) with respect to computing activity observed during the malware analysis. Additionally or alternatively, detection module 106 may detect the suspicious discrepancy among monitor components 208(1)-(N) with respect to computing activity observed after the malware analysis. For example, detection module 106 may detect that a monitor component within monitor components 208(1)-(N) observed an alteration to the geometry of a disk after the malware analysis. In this example, detection module 106 may also detect that no other monitor components observed that alteration to the geometry of the disk even though at least one other monitor component is expected to observe that type of alteration.

As illustrated in FIG. 3, at step 306 one or more of the systems described herein may determine, based at least in part on the suspicious discrepancy, that the file demonstrates a detection-evasion behavior that led to the other monitor component not observing the computing activity in connection with the malware analysis. For example, determination module 108 may, as part of server 206 and/or computing device 202 in FIG. 2, determine that file 212 demonstrates a detection-evasion behavior that led to the other monitor component not observing the computing activity in connection with the malware analysis. Determination module 108 may arrive at this determination based at least in part on the suspicious discrepancy.

The term "detection-evasion behavior," as used herein, generally refers to any type or form of run-time characteristic, attribute, and/or behavior of a file that potentially enables the file to avoid being identified as malware and/or being suspected of containing malware. In one example, the detection-evasion behavior demonstrated by file 212 may indicate and/or suggest that file 212 is attempting to evade detection by obfuscating the computing activity from monitor component 208(N). Examples of this detection-evasion behavior include, without limitation, skipping memory locations that include user mode hooks and/or kernel mode hooks within an automated execution environment, searching for user mode hooks and/or kernel mode hooks within an automated execution environment, diverting the flow of execution due at least in part to user mode hooks and/or kernel mode hooks detected within an automated execution environment, variations of one or more of the same, combinations of one or more of the same, or any other detection-evasion behavior.

The systems described herein may perform step 306 in a variety of ways and/or contexts. In one example, determination module 108 may determine that file 212 demonstrates the detection-evasion behavior by determining that file 212 is attempting to avoid being identified as malware and/or being suspected of containing malware. For example, file 212 may obfuscate the computing activity from monitor component 208(N) in an attempt to avoid being identified as malware and/or being suspected of containing malware. In this example, determination module 108 may determine that file 212 demonstrates the detection-evasion behavior due at least in part to file 212 obfuscating the computing activity from monitor component 208(N).

In response to the determination that file 212 demonstrates the detection-evasion behavior, classification module 110 may classify file 212 as potentially malicious. For example, classification module 110 may add file 212 to a list of potentially malicious files. Additionally or alternatively, classification module 110 may notify a computing community (such as a security vendor's customer base) that file 212 potentially contains malware.

In some examples, modification module 112 may modify at least one aspect of automated execution environment 210 to account for the detection-evasion behavior during any subsequent malware analysis in automated execution environment 210. For example, modification module 112 may change the placement of one or more of monitor components 208(1)-(N) (e.g., one or more user mode hooks and/or kernel mode hooks) in automated execution environment 210 to account for the detection-evasion behavior. Additionally or alternatively, modification module 112 may add one or more new monitor components internal or external to automated execution environment 210 to account for the detection-evasion behavior. By making such a modification to account for the detection-evasion behavior, modification module 112 may effectively thwart and/or undermine that detection-evasion behavior during subsequent malware analyses performed by automated execution environment 210.

As explained above in connection with method 300 in FIG. 3, an automated execution environment may identify various behaviors of a file undergoing a malware analysis based at least in part on computing activity observed inside and outside of the automated execution environment. For example, the automated execution environment may include various monitors that observe certain computing activity from a perspective internal to the automated execution environment. Additionally or alternatively, the underlying computing device that implements the automated execution environment and/or other devices within the same network may include other monitors that observe certain computing activity from a perspective external to the automated execution environment.

By collecting information that identifies the computing activities observed by the different monitors in connection with the malware analysis, the automated execution environment may be able to identify certain discrepancies among the monitors. For example, the automated execution environment may determine that an API call was observed by one monitor but not observed by another monitor. Additionally or alternatively, the automated execution environment may determine that data writes and/or network traffic were observed by one monitor but not observed by another monitor. The automated execution environment may then determine that the file undergoing the malware analysis exhibits a detection-evasion behavior based at least in part on the discrepancies identified among the monitors. In response, the automated execution environment may classify the file as malware and/or modify the automated execution environment or subsequent malware analyses to account for the discrepancies.

Figure 5:
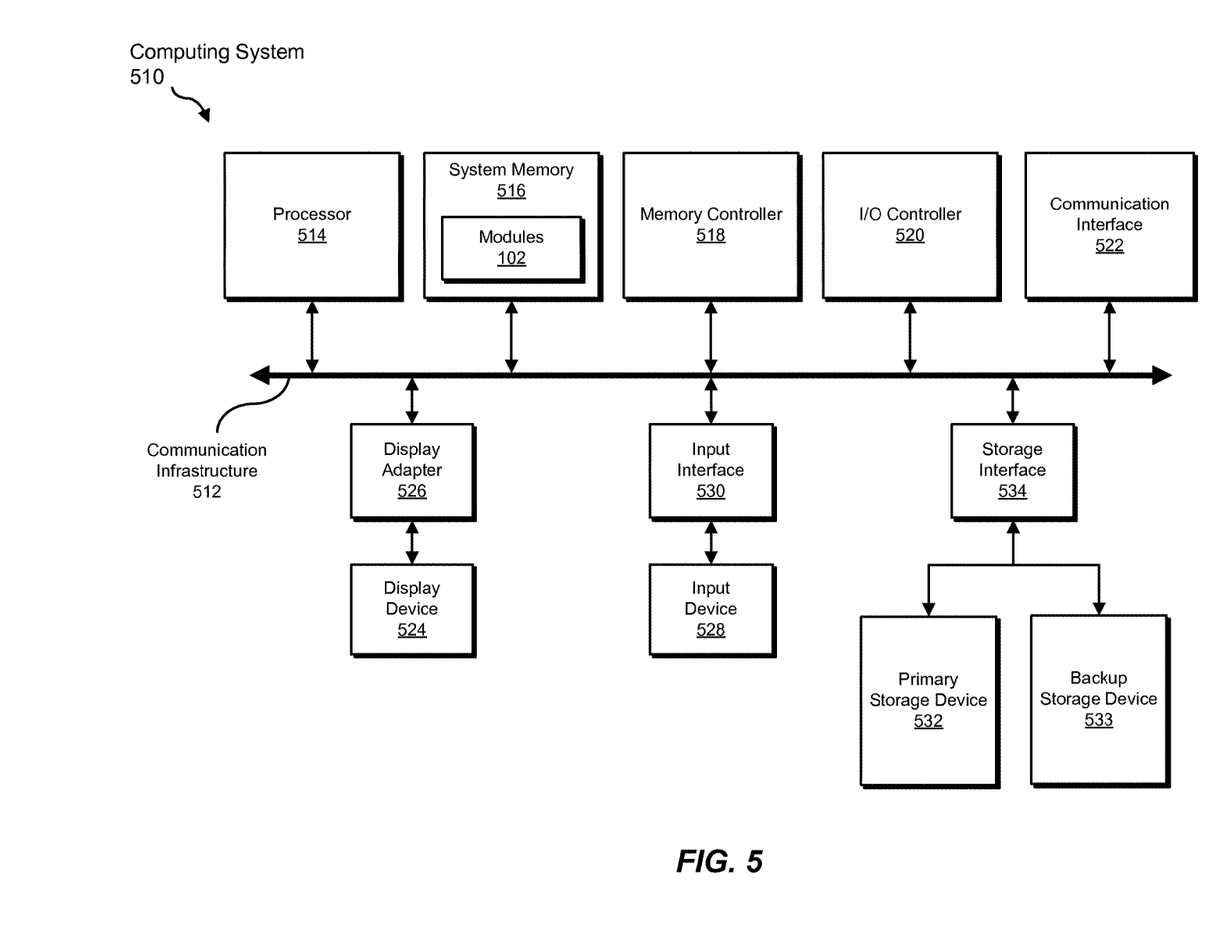
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
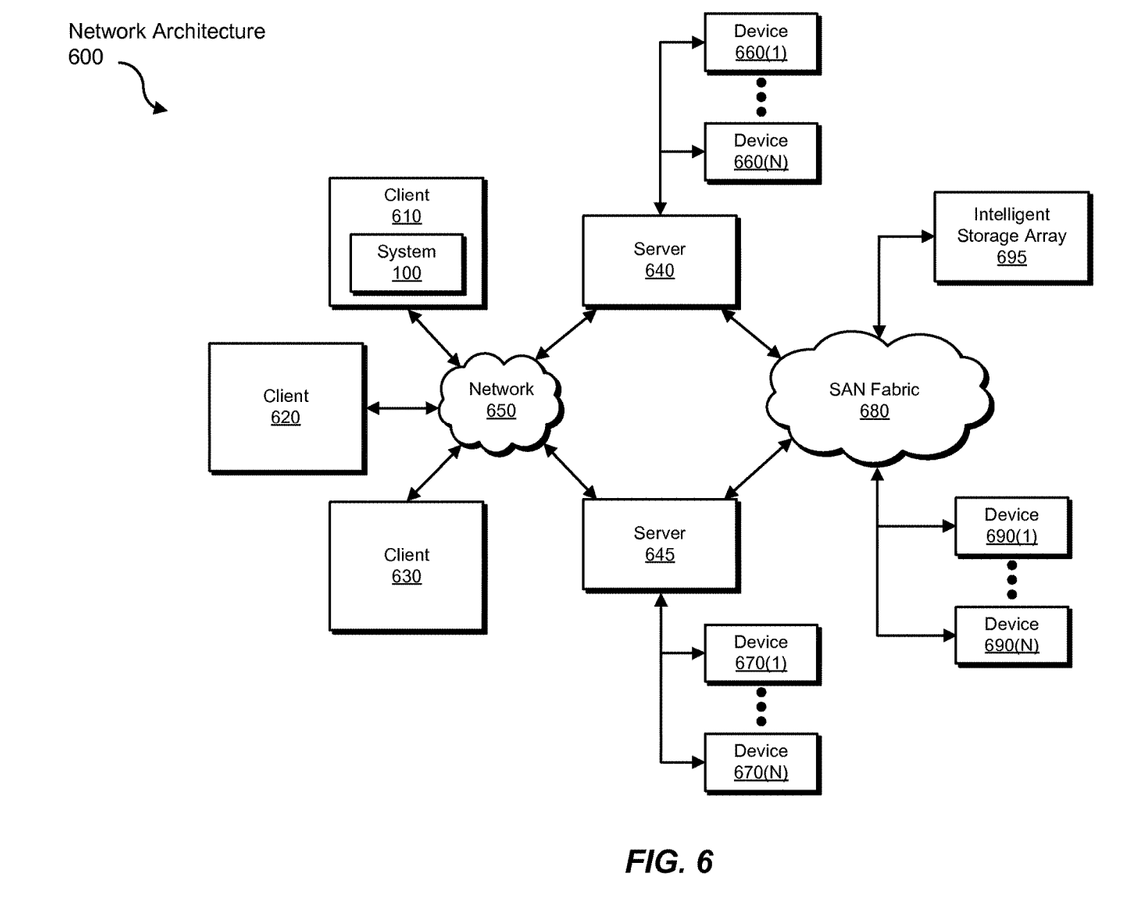
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying detection-evasion behaviors of files undergoing malware analyses.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying detection-evasion behaviors of files undergoing malware analyses, at least a portion of the method being performed by a computing device comprising at least one processor, the method comprising:
monitoring, by a plurality of monitor components related to an automated execution environment running on a server, a file that is undergoing a malware analysis in the automated execution environment running on the server, the plurality of monitor components comprising:
a user mode hook; and
a kernel mode hook;
detecting at least one discrepancy between the user mode hook and the kernel mode hook with respect to computing activity that occurred at a specific time and is observed in connection with the malware analysis by:
determining that one of the user mode hook and the kernel mode hook has observed the computing activity that occurred at the specific time in connection with the malware analysis; and
determining that the other one of the user mode hook and the kernel mode hook has not observed the computing activity that occurred at the specific time in connection with the malware analysis;
determining, based at least in part on the discrepancy, that the file demonstrates a detection-evasion behavior that led to the other one of the user mode hook and the kernel mode hook not observing the computing activity in connection with the malware analysis due at least in part to the file having skipped a memory location that includes the other one of the user mode hook and the kernel mode hook during the malware analysis;
classifying the file as potentially malicious due at least in part to the detection-evasion behavior demonstrated by the file; and
modifying at least one aspect of the automated execution environment to account for the detection-evasion behavior during a subsequent malware analysis in the automated execution environment.

2. The method of claim 1, wherein monitoring the file undergoing the malware analysis comprises at least one of:
monitoring computing activity in connection with the malware analysis from inside of the automated execution environment; and
monitoring computing activity in connection with the malware analysis from outside of the automated execution environment.

3. The method of claim 1, wherein determining that the file demonstrates the detection-evasion behavior comprises determining that the file is attempting to evade detection by obfuscating the computing activity from the other one of the user mode hook and the kernel mode hook.

4. The method of claim 1, wherein monitoring the file undergoing the malware analysis comprises directing the automated execution environment to execute the file in connection with the malware analysis.

5. The method of claim 1, wherein detecting the discrepancy between the user mode hook and the kernel mode hook comprises at least one of:
detecting the discrepancy between the user mode hook and the kernel mode hook with respect to computing activity observed during the malware analysis; and
detecting the discrepancy between the user mode hook and the kernel mode hook with respect to computing activity observed after the malware analysis.

6. The method of claim 1, wherein the computing activity comprises at least one of:
performing an input/output operation;
writing data to a storage device;
reading data from a storage device;
transmitting data across a network;
changing one or more registry keys; and
altering a configuration of a storage device.

7. The method of claim 1, wherein the plurality of monitoring components further comprise at least one of:
a packet capture component;
a file system monitor; and
a network switch.

8. A system for identifying detection-evasion behaviors of files undergoing malware analyses, the system comprising:
a monitoring module, stored in memory, that monitors, via a plurality of monitor components related to an automated execution environment running on a server, a file that is undergoing a malware analysis in the automated execution environment running on the server, the plurality of monitor components comprising:
a user mode hook; and
a kernel mode hook;
a detection module, stored in memory, that detects at least one discrepancy between the user mode hook and the kernel mode hook with respect to computing activity that occurred at a specific time and is observed in connection with the malware analysis by:
determining that one of the user mode hook and the kernel mode hook has observed the computing activity that occurred at the specific time in connection with the malware analysis; and
determining that the other one of the user mode hook and the kernel mode hook has not observed the computing activity that occurred in connection with the malware analysis;
a determination module, stored in memory, that determines, based at least in part on the discrepancy, that the file demonstrates a detection-evasion behavior that led to the other one of the user mode hook and the kernel mode hook not observing the computing activity in connection with the malware analysis due at least in part to the file having skipped a memory location that includes the other one of the user mode hook and the kernel mode hook during the malware analysis;
a classification module, stored in memory, that classifies the file as potentially malicious due at least in part to the detection-evasion behavior demonstrated by the file;
a modification module, stored in memory, that modifies at least one aspect of the automated execution environment to account for the detection-evasion behavior during a subsequent malware analysis in the automated execution environment; and
at least one physical processor that executes the monitoring module, the detection module, the determination module, the classification module, and the modification module.

9. The system of claim 8, further comprising a classification module that classifies the file as potentially malicious due at least in part to the detection-evasion behavior demonstrated by the file.

10. The system of claim 8, wherein the monitoring module monitors the file undergoing the malware analysis by at least one of:
    monitoring computing activity in connection with the malware analysis from inside of the automated execution environment; and
    monitoring computing activity in connection with the malware analysis from outside of the automated execution environment.

11. The system of claim 8, wherein the determination module determines that the file demonstrates the detection-evasion behavior by determining that the file is attempting to evade detection by obfuscating the computing activity from the other one of the user mode hook and the kernel mode hook.

12. The system of claim 8, wherein the monitoring module monitors the file undergoing the malware analysis by directing the automated execution environment to execute the file in connection with the malware analysis.

13. The system of claim 8, wherein the detection module detects the discrepancy between the user mode hook and the kernel mode hook by at least one of:
    detecting the discrepancy between the user mode hook and the kernel mode hook with respect to computing activity observed during the malware analysis; and
    detecting the discrepancy between the user mode hook and the kernel mode hook with respect to computing activity observed after the malware analysis.

14. The system of claim 8, wherein the computing activity comprises at least one of:
    performing an input/output operation;
    writing data to a storage device;
    reading data from a storage device;
    transmitting data across a network;
    changing one or more registry keys; and
    altering a configuration of a storage device.

15. The system of claim 8, wherein the plurality of monitoring components further comprise at least one of:
    a packet capture component;
    a file system monitor; and
    a network switch.

16. A non-transitory computer-readable medium comprising one or more computer-executable instructions that, when executed by at least one processor of a computing device, cause the computing device to:
    monitor, by a plurality of monitor components related to an automated execution environment running on a server, a file that is undergoing a malware analysis in the automated execution environment running on the server, the plurality of monitor components comprising:
        a user mode hook; and
        a kernel mode hook;
    detect at least one discrepancy between the user mode hook and the kernel mode hook with respect to computing activity that occurred at a specific time and is observed in connection with the malware analysis by:
        determining that one of the user mode hook and the kernel mode hook has observed the computing activity that occurred at the specific time in connection with the malware analysis; and
        determining that the other one of the user mode hook and the kernel mode hook has not observed the computing activity that occurred at the specific time in connection with the malware analysis;
    determine, based at least in part on the discrepancy, that the file demonstrates a detection-evasion behavior that led to the other one of the user mode hook and the kernel mode hook not observing the computing activity in connection with the malware analysis due at least in part to the file having skipped a memory location that includes the other one of the user mode hook and the kernel mode hook during the malware analysis;
    classify the file as potentially malicious due at least in part to the detection-evasion behavior demonstrated by the file; and
    modify at least one aspect of the automated execution environment to account for the detection-evasion behavior during a subsequent malware analysis in the automated execution environment.

* * * * *